Figure 1:
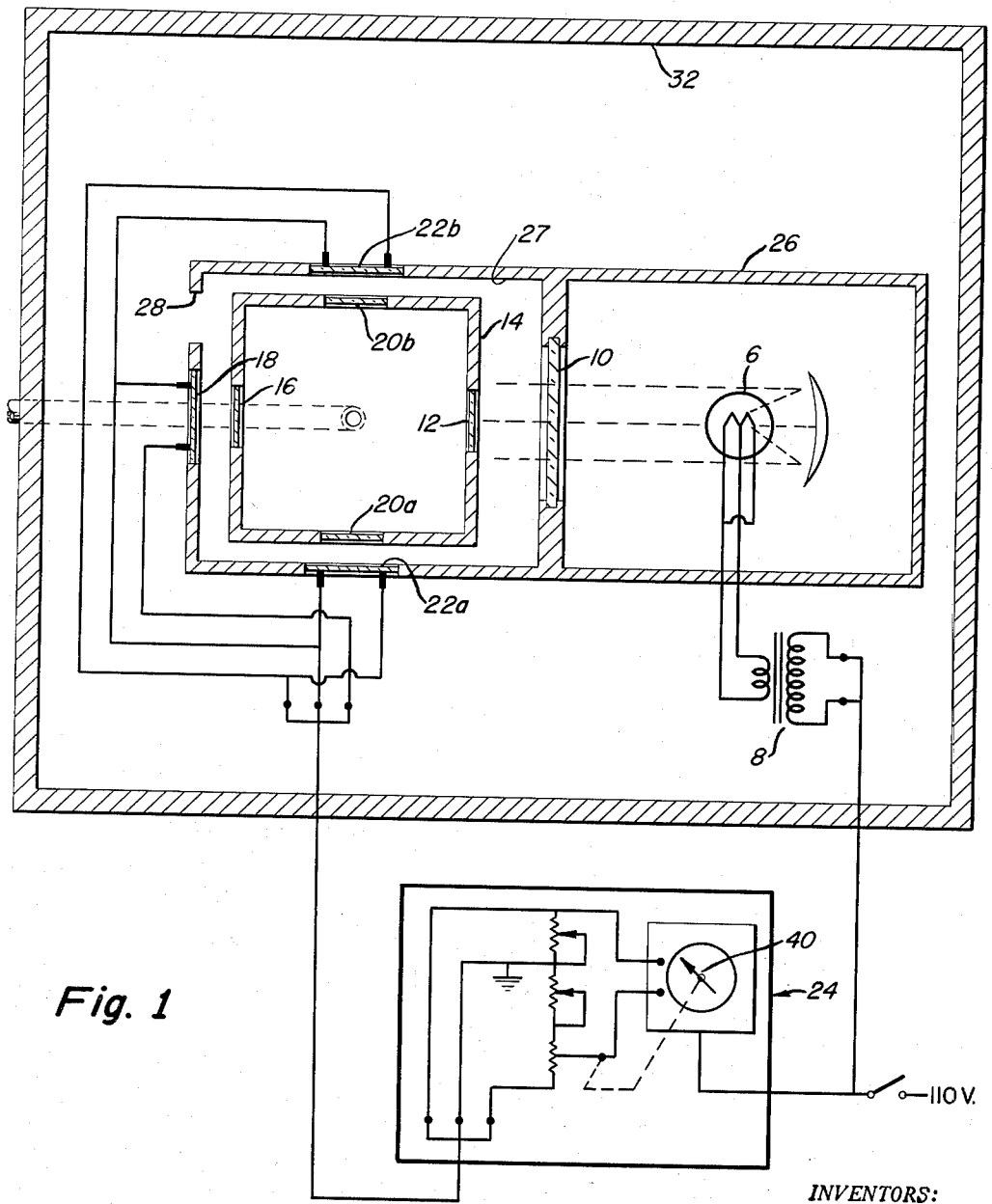

INVENTORS:
Wendell P. Cropper
Melvern C. Hoff
Paul Evan
BY John W. Butcher
ATTORNEY INVENTORS:
Wendell P. Cropper
Melvern C. Hoff
Paul Evan BY John W. Butcher
ATTORNEY 3,234,846
CONTINUOUSLY RECORDING TURBIDITY METER
Wendell P. Cropper, Lansing, Ill., and Melvern C. Hoff, Highland, and Paul Evan, Hammond, Ind., assignors to Standard Oil Company, Chicago, Ill., a corporation of Indiana
Filed Nov. 18, 1959, Ser. No. 853,756
1 Claim. (Cl. 88—14)

This invention relates to an apparatus and method for determining the turbidity of fluids and, more particularly, to a continuously recording turbidity meter, a calibration standard therefor, and a method for operating same.

Numerous methods have been developed to determine the amount of sediment within fluids flowing through a pipeline. One of the methods is to make a gravimetric analysis of individual samples or of composite samples taken at various intervals. This method is laborious and expensive and does not provide a continuous sediment measurement. Various turbidity meters have been developed to determine the amount of sediment within a fluid stream. These turbidity meters, for the most part, are operated similar to the gravimetric analysis, that is, individual or composite samples are taken and placed within a conventional turbidity meter. Here again, the analysis is not of a continuous nature.

Our turbidity meter determines the quantity of small particles suspended in a fluid by measuring the lateral shattering of light produced by the suspended particles when a train of light is directed through a solution containing said suspended particles. As a beam of light passes through the fluid sample, the light is dispersed upon striking particles within the fluid. The intensity of the beam diminishes as the beam passes through the fluid. Under these conditions, the fluid turbidity is proportional to the ratio of the scattered light to the transmitted light. As the turbidity increases, more light will be scattered and the ratio will increase. Cloudiness caused by free water droplets also contributes to turbidity. To measure the turbidity caused by only the sediment particles, the effect due to water may be eliminated, for example, by raising the fluid temperature so that the water will dissolve.

This turbidity meter has windows on four sides of a sample chamber. Three of the windows accommodate photocells and the fourth window is used to admit a beam of light. The window directly opposite the window used to admit light detects transmitted light while the remaining two photocells on adjacent sides detect scattered light. The photocell signals from both the measured transmitted light and the measured scattered light are combined in a null-balance circuit in such a manner the ratio of scattered light to transmitted light is recorded.

Due to the fact that the turbidity meter reading is a relative reading (ratio of scattered light to transmitted light), the meter should be zeroed with respect to a known reference standard. This procedure correlates the ratio reading to a known quantitative value. The standard may be used subsequent to the initial calibration step to re-calibrate the instrument and thus assure a continuous reliable quantitative measurement.

It is therefore an object of this invention to provide a continuous recording turbidity meter. It is a further object of this invention to provide a method and an apparatus of calibrating a continuous recording turbidity meter. It is a further object of this invention to provide a permanent-type calibration standard for a turbidity meter. It is still a further object of this invention to provide a method of manufacturing a permanent-type calibration standard.

Briefly described, the invention includes a calibration unit in combination with a sample chamber wherein the light source and photocell apparatus used to analyze fluids within the sample chamber may be calibrated at any desired time. A novel sample standard is used to calibrate the light source and the photocell apparatus.

Figure 2:
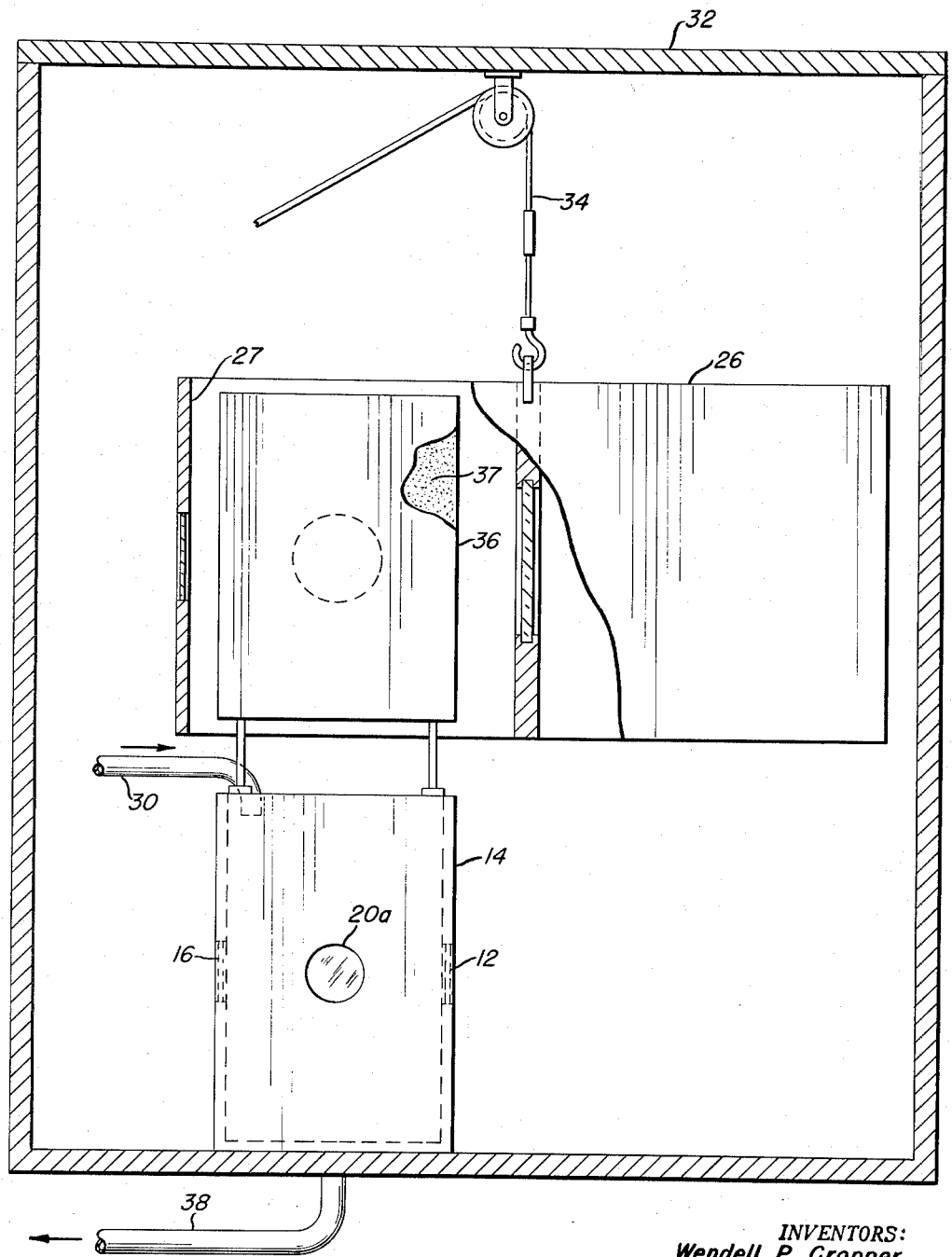

The invention will be readily appreciated as the same becomes better understood by reference to the following detailed description when considered in connection with of the turbidity meter; and FIGURE 1 is a plan view, partially in cross section, the accompanying drawings wherein:

FIGURE 2 is an elevational view, partially in cross section, showing the provision for calibrating the light source and photocell apparatus.

In reference to the drawings and, more particularly, to FIGURE 1, a light source 6 is energized from a conventional power supply 8. A light beam is directed from the light source 6 through a filter 10 and is passed through a light window 12 into the sample chamber. A portion of the light beam passes directly through the sample chamber 14, through the transmitted light window 16, and is received on the filament of a transmitted light photocell 18. A portion of the light beam is scattered as it strikes sediment particles within the sample chamber 14. A portion of this scattered light passes through reflected light windows 20a and 20b and is received on the filaments of the reflected light photocells 22a and 22b.

The energy signals from the transmitted light photocell 18 and from the reflected light photocells 22a and 22b are combined in an electrical network and recorded by the recorder 24. The light source and photocell apparatus are mounted within a cage 26. The cage 26 has an opening 27 therethrough adapted to surround the sample chamber 14. A slot 28 is provided within the cage 26. The slot 28 provides for movement of the cage 26 without the cage striking the sample inlet pipe 30 (FIGURE 2). The cage 26 is suspended within a cabinet 32 by means of a wire line 34.

The calibration standard comprises a light transmitting solid matrix having imbedded therein a predetermined quantity of light reflecting particles. It is preferable to disperse the particles homogeneously throughout the matrix. With the particles dispersed homogeneously, the cage 26 may be positioned about the calibration standard at any of a number of locations and the calibration reading will be essentially the same. A light transmitting synthetic resin, a light transmitting natural resin, or like material, may be used as the matrix material. Light-transmitting polyester resins are the preferred matrix material. This material should have a softening point in excess of the maximum temperature encountered while using the calibration standard.

Examples of solid light reflecting particles are silica, silica compounds, bauxite, metal, metal oxides, and the like. The particles are preferably within a range of from about ⅕₅ to about 25 times the size of the sediment particles found in the fluid stream. Sediment particles which have been removed from the fluid stream may be used as the light reflecting particle.

A calibration standard was prepared by mixing a silica-alumina catalytic cracking catalyst having a 10 to 20 micron particle size in a transparent liquid unsaturated polyester resin. The resin was a reaction product of saturated and unsaturated dibasic acids esterified with dihydric alcohols combined with a styrene monomer. The average physical properties of this hardened polyester resin are as follows:

| | |
|---|---|
| Specific gravity | 1.22 g./cc. |
| Tensile strength | 4,000 p.s.i. |
| Flexural strength | 10,000 p.s.i. |
| Flexural modulus | 550,000 p.s.i. |
| Impact strength | 0.2 ft.-lbs. |
| Hardness: | |
| (a) Rockwell (M) value 115 | #1. |
| (b) Barcol value | 40–45. |
| Heat distortion point | 180° F. (ASTM). |

The ratio of silica-alumina to monomer was 1.5 g. per 150 cc. of liquid. The mixture of the monomer and silica-alumina was poured into a mold and allowed to harden under the influence of a catalyst at a temperature of 180° F. After solidification, the mold was removed thus leaving the finished transparent matrix having reflective particles homogeneously dispersed therein.

In operation, the cage 26 is positioned about the sample chamber 14 as shown in FIGURE 1. Fluid enters the sample chamber 14 by way of the inlet pipe 30. Fluid is removed from the sample chamber 14 by way of exit pipe 38. The light source 6 is energized by the power supply 8. The recording apparatus 24 provides a continuous record of the amount of sediment within the fluid sample by the pointer 40. The light source and the photocells may be calibrated at any predetermined time by moving the cage 26 from a first position surrounding the sample chamber 14 to a second position surrounding the calibration standard 36 with a light transmitting solid matrix 37 having a quantity of light-reflecting particles. After the calibration reading is taken, the cage 26 may be lowered to the first position surrounding the sample chamber 14.

Although we have described this invention by reference to specific embodiments, it is to be understood that this is by way of illustration only and that our invention is not limited thereto. Accordingly, it is contemplated that other apparatus can be devised employing the basic features of our invention without departing from the spirit thereof as described herein or as defined by the appended claim.

We claim:

A continuous recording turbidity meter comprising a sample chamber, a cage adapted to surround said sample chamber, a light source connected to said cage adapted to transmit a beam of light through said sample chamber, a first photocell connected to said cage adapted to detect transmitted light from said light beam, at least one other second photocell connected to said cage adapted to detect reflected light from within said sample chamber, means for comparing the signal from said first photocell with the signal from said second photocell and for indicating the ratio thereof, a calibration standard adjacent said sample chamber, said calibration standard comprising a predetermined quantity of light-reflecting particles dispersed within a light-transmitting solid matrix, and means to move said cage from a first position surrounding said sample chamber to a second position surrounding said calibration standard.

References Cited by the Examiner

UNITED STATES PATENTS

| | | | |
|---|---|---|---|
| 2,024,720 | 12/1935 | Cornell et al. | 250—218 |
| 2,042,281 | 5/1936 | Traver | 250—218 |
| 2,060,957 | 11/1936 | Tarvin et al. | 250—218 |
| 2,168,331 | 8/1939 | Fields et al. | 18—58 |
| 2,301,367 | 11/1942 | Cahusac et al. | |
| 2,316,239 | 4/1943 | Hare. | |
| 2,361,235 | 10/1944 | Pick | 250—218 |
| 2,411,092 | 11/1946 | Hood et al. | 250—218 |
| 2,447,847 | 8/1948 | Dresser | 250—218 X |
| 2,541,896 | 2/1951 | Vasileff et al. | 154—43 |
| 2,542,386 | 2/1951 | Beattie | 18—58 |
| 2,551,833 | 5/1951 | Ewing | 88—14 |
| 2,580,500 | 1/1952 | Albert | 88—14 |
| 2,590,827 | 3/1952 | Stamm et al. | 88—14 |
| 2,806,509 | 9/1957 | Bozzacco et al. | 154—28 |
| 2,931,746 | 4/1960 | Robitschek et al. | 154—43 |

FOREIGN PATENTS 586,303 11/1959 Canada.

OTHER REFERENCES

Model "F" Agton, a publication of the Magnuson Engineers Inc., received by U.S. Patent Office on May 20, 1958.

JEWELL H. PEDERSEN, *Primary Examiner.*

RICHARD M. WOOD, EMIL G. ANDERSON,
*Examiners.*